United States Patent
Blunier et al.

(10) Patent No.: US 8,794,346 B2
(45) Date of Patent: Aug. 5, 2014

(54) TOWED IMPLEMENT STRESS RELIEVED JOINTS

(75) Inventors: Timothy R. Blunier, Danvers, IL (US); Matthew R. Sudbrink, Metamora, IL (US); Scott Robert Faust, Philo, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/605,070

(22) Filed: Sep. 6, 2012

(65) Prior Publication Data

US 2014/0060871 A1 Mar. 6, 2014

(51) Int. Cl.
*A01B 19/00* (2006.01)
*A01B 23/00* (2006.01)
*A01B 39/00* (2006.01)

(52) U.S. Cl.
USPC ............................. 172/614; 172/311

(58) Field of Classification Search
USPC ................. 172/614, 616, 618, 311, 621, 288; 414/686, 722
See application file for complete search history.

(56) References Cited

U.S. PATENT DOCUMENTS

| | | | |
|---|---|---|---|
| 1,906,107 A | 4/1933 | Schirmer | |
| 2,527,355 A | 3/1947 | Cook et al. | |
| 3,548,954 A * | 12/1970 | Lindemann | 172/311 |
| 5,622,229 A * | 4/1997 | Degelman | 172/621 |
| 6,675,907 B2 * | 1/2004 | Moser et al. | 172/311 |
| 7,001,133 B2 * | 2/2006 | Muramoto | 414/686 |
| 7,520,713 B2 * | 4/2009 | Nishi et al. | 414/722 |
| 7,805,863 B2 | 10/2010 | Vennard et al. | |
| 8,061,956 B2 | 11/2011 | Burrenga | |
| 8,186,449 B2 * | 5/2012 | Hackert et al. | 172/288 |
| 2003/0223851 A1 * | 12/2003 | Muramoto | 414/686 |

FOREIGN PATENT DOCUMENTS

| | | |
|---|---|---|
| FR | 2317136 A1 | 2/1977 |
| GB | 607293 | 8/1948 |
| GB | 831869 | 4/1960 |
| GB | 1160127 | 7/1969 |
| GB | 1552913 | 7/1975 |
| SU | 1752246 A1 | 8/1992 |

* cited by examiner

*Primary Examiner* — Árpád Fábián-Kovács
(74) *Attorney, Agent, or Firm* — Rebecca L. Henkel (57) ABSTRACT

An agricultural implement is provided that includes a first tool bar supporting first ground engaging tools. The agricultural implement further includes a second tool bar supporting second ground engaging tools and coupled to the first tool bar by a pivot joint. Additionally, the agricultural implement includes a working plate secured to the first tool bar and having a joint structure partially defining the pivot joint. Furthermore, the agricultural implement includes a stress feathering plate secured between the working plate and the first tool bar and secured to both the working plate and the first tool bar, the stress feathering plate extending beyond the working plate and having a contour that provides a reduced stress gradient when the first tool bar, the working plate and the stress feathering plate are loaded by engagement of the first and second ground engaging tools with the ground.

20 Claims, 6 Drawing Sheets

TOWED IMPLEMENT STRESS RELIEVED JOINTS

BACKGROUND

The invention relates generally to ground working equipment, such as agricultural equipment, and more specifically, to an implement having reinforcing members that reduce stress concentrations encountered when forces are applied by engagement of the ground.

Generally, fertilizer application implements are towed behind a tractor or other work vehicle via a hitch assembly secured to a rigid frame of the implement. These fertilizer application implements typically include one or more ground engaging tools or openers that form a path for fertilizer deposition into the soil. The openers are used to break the soil, thereby enabling injection nozzles (e.g., positioned behind the openers) to deposit fertilizer at a desired depth beneath the soil surface. In certain embodiments, the implement may include knives (e.g., positioned behind the openers), instead of the injection nozzles, to flow the liquid fertilizer into respective trenches formed by the openers and knives. Using such implements, fertilizer may be distributed throughout a field, either before or after planting, to facilitate enhanced crop development.

BRIEF DESCRIPTION

In one embodiment, a towed implement includes a first tool bar supporting first ground engaging tools. The agricultural implement also includes a second tool bar supporting second ground engaging tools and coupled to the first tool bar by a pivot joint. Additionally, a working plate secured to the first tool bar and having a joint structure partially defining the pivot joint. Furthermore, a stress feathering plate secured between the working plate and the first tool bar and secured to both the working plate and the first tool bar. The stress feathering plate extends beyond the working plate and has a contour that provides a reduced stress gradient when the first tool bar, the working plate and the stress feathering plate are loaded at least in part by engagement of the first and second ground engaging tools with the ground.

In another embodiment, a towed implement includes a first tool bar supporting first ground engaging tools. The towed implement further includes a second tool bar supporting second ground engaging tools and coupled to the first tool bar by a pivot joint. Additionally, the agricultural implement includes a fore structure disposed on a fore side of the first tool bar, the fore structure having a fore working plate secured to the fore side of the first tool bar and having a joint structure partially defining the pivot joint, and a fore stress feathering plate secured between the fore working plate and the fore side of the first tool bar and secured to both the fore working plate and the fore side of the first tool bar, the fore stress feathering plate extending beyond the fore working plate and having a contour that provides a reduced stress gradient when the first tool bar, the fore working plate and the fore stress feathering plate are loaded at least in part by engagement of the first and second ground engaging tools with the ground. Furthermore, the agricultural implement includes an aft structure disposed on an aft side of the first tool bar, the aft structure includes an aft working plate secured to the aft side of the first tool bar and having a joint structure partially defining the pivot joint, and an aft stress feathering plate secured between the aft working plate and the aft side of the first tool bar and secured to both the aft working plate and the aft side of the first tool bar, the aft stress feathering plate extending beyond the aft working plate and having a contour that provides a reduced stress gradient when the first tool bar, the aft working plate and the aft stress feathering plate are loaded at least in part by engagement of the first and second ground engaging tools with the ground.

In a further embodiment, a towed implement includes a first tool bar supporting first ground engaging tools. The agricultural implement also includes a second tool bar supporting second ground engaging tools and coupled to the first tool bar by a pivot joint. Additionally, the agricultural implement includes a first structure disposed on the first tool bar, the first structure includes a first working plate secured to the first tool bar and having a joint structure partially defining the pivot joint, and a first stress feathering plate secured between the first working plate and the first tool bar and secured to both the first working plate and the first tool bar, the first stress feathering plate extending beyond the first working plate and having a contour that provides a reduced stress gradient when the first tool bar, the first working plate and the first stress feathering plate are loaded at least in part by engagement of the first and second ground engaging tools with the ground. Furthermore, the agricultural implement includes a second structure disposed on the second tool bar, the second structure includes a second working plate secured to the second tool bar and having a joint structure partially defining the pivot joint, and a second stress feathering plate secured between the second working plate and, the second tool bar and secured to both the second working plate and the second tool bar, the second stress feathering plate extending beyond the second working plate and having a contour that provides a reduced stress gradient when the second tool bar, the second working plate and the second stress feathering plate are loaded by engagement of the first and second ground engaging tools with the ground.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
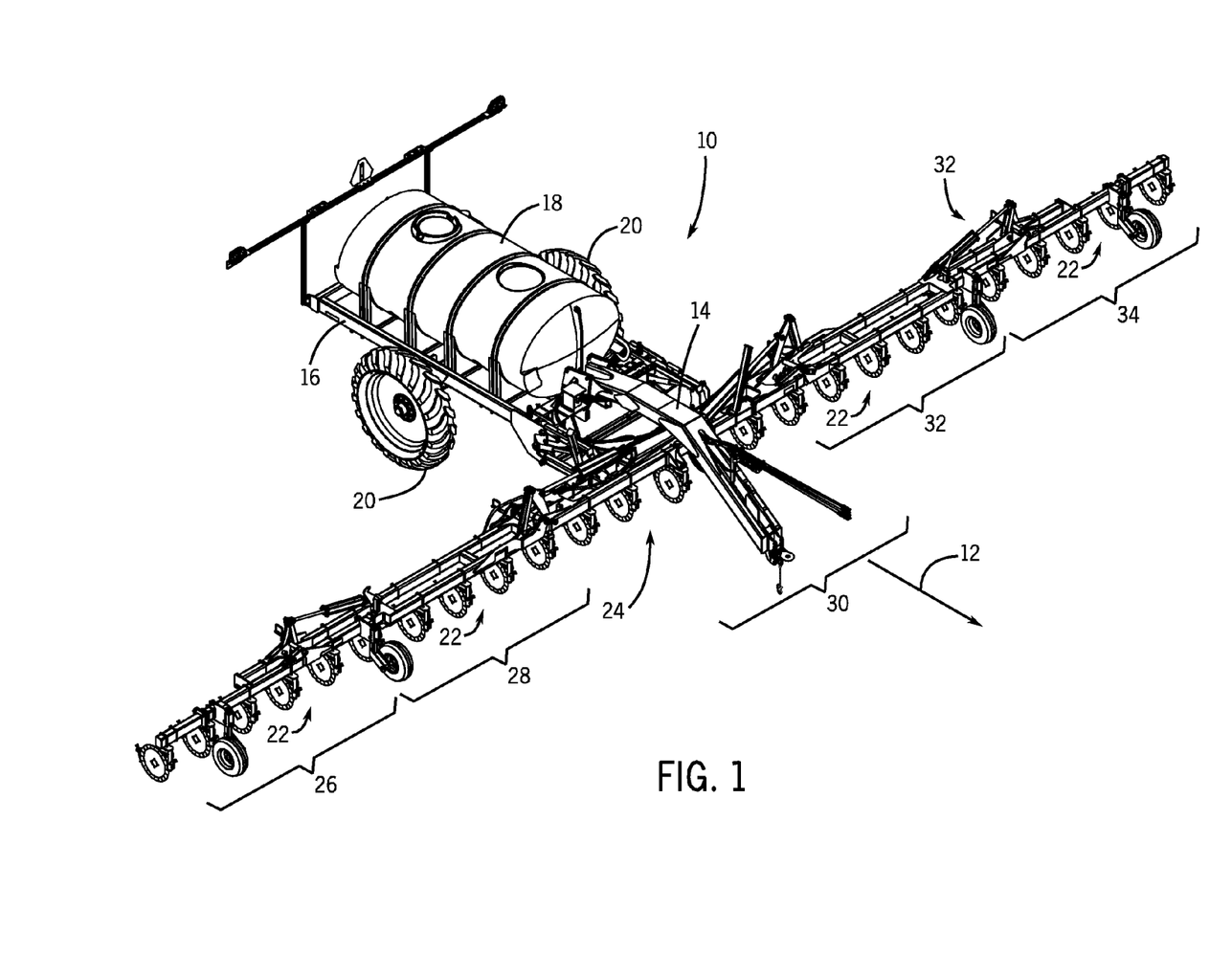
FIG. 1 is a perspective view of an embodiment of an agricultural implement having a storage tank mounted between frame rails, foldable wings and mechanical reinforcing members designed to reduce stresses.

FIG. 1 is a perspective view of an embodiment of an agricultural implement 10 having a storage tank mounted between frame rails. In the illustrated embodiment, the implement 10 is configured to be towed along a direction of travel 12 by a work vehicle, such as a tractor or other prime mover.

The work vehicle may be coupled to the implement 10 by a hitch assembly 14, such as the illustrated "goose neck" pull frame. As illustrated, the hitch assembly 14 is coupled to a main frame 16 of the implement 10 to facilitate towing of the implement 10 in the direction of travel 12. In the illustrated embodiment, the main frame 16 supports a storage tank 18 configured to house a flowable agricultural product, such as liquid fertilizer. A pair of wheels 20 coupled to the main frame 16 is configured to support the weight of the frame 16, the storage tank 18, and the flowable agricultural product, thereby enabling the implement 10 to be towed across the field.

The implement 10 is configured to transfer the flowable agricultural product from the storage tank 18 to multiple row units 22 of a tool bar assembly 24. Each row unit 22 includes a ground engaging tool configured to break the soil, thereby excavating a trench into the soil. An injection nozzle or knife (e.g., positioned behind the ground engaging tool) is configured to deposit flowable agricultural product from the storage tank 18 into the trench formed by the ground engaging tool. In certain embodiments, the penetration depth of the ground engaging tools is adjustable to facilitate deposition of the agricultural product at a desired depth beneath the soil surface. Accordingly, a flowable agricultural product, such as liquid fertilizer, may be distributed throughout a field, either before or after planting, to facilitate enhanced crop development.

While the illustrated implement 10 includes 25 row units 22, it should be appreciated that alternative implements may include more or fewer row units 22. For example, certain implements 10 include a tool bar assembly 24 having a right outer wing 26, a right inner wing 28, a central tool bar 30, a left inner wing 32, and a left outer wing 34. Additionally, certain implements may include the row units 22 distributed across the central tool bar 30 and wings 26, 28, 32, and 34. As discussed below in further detail, the number of row units and the spacing between row units may be particularly selected to correspond to the arrangement of row units on respective seeding or planting implements. For example, the implement 10 may include 25 row units 22 spaced 30 inches from one another. Accordingly, as the implement 10 is towed across a field, the row units 22 deposit fertilizer in rows having 30-inch spacing. After the fertilizer is applied, a seeding or planting implement (e.g., having row units spaced 30 inches from one another) may deposit seeds between the rows of fertilizer (e.g., the approximate midpoint between rows), thereby facilitating enhanced crop development. In addition, the implement 10 may be utilized to apply fertilizer to previously planted seeds (e.g., via injecting fertilizer between rows of the previously planted seeds).

As discussed in further detail below, the agricultural implement 10 has foldable wings (e.g., right outer wing 26) each having one or more row units 22 attached. Additionally, the foldable wings may fold to allow the agricultural implement 10 to change the number of row units 22 that engage the ground during operation of the agricultural implement 10 on a field. By enabling the agricultural implement 10 to change the number of row units 22 engaging the field, the agricultural implement 10 may be efficiently operated in fields planted with row planters with various numbers of rows planted. For example, in certain embodiments, the agricultural implement 10 may be used in a field that has been planted with a planter having 16 rows when one or more wings are placed in a folded position, but the agricultural implement 10 may be suitably used in a field that has been planted with a planter having 24 rows when the wings are deployed in the unfolded position. In other embodiments, the agricultural implement 10 may engage 25 or more row units 22 with the ground when all wings are deployed in the unfolded position, but may engage less row units 22 with the ground when one or more wings are deployed in the folded position.

By enabling the agricultural implement to operation with variable widths, one model of the agricultural implement 10 may be used on to fertilize a variety of fields. Furthermore, by making one agricultural implement 10 capable of operating in various field types, a versatile embodiment of the agricultural implement 10 enables many users (e.g., an agricultural cooperative program) to purchase one agricultural implement 10 that may be shared between multiple field types within the group even if the fields have various sizes and/or are planted with various planter sizes/types.

Figure 2:
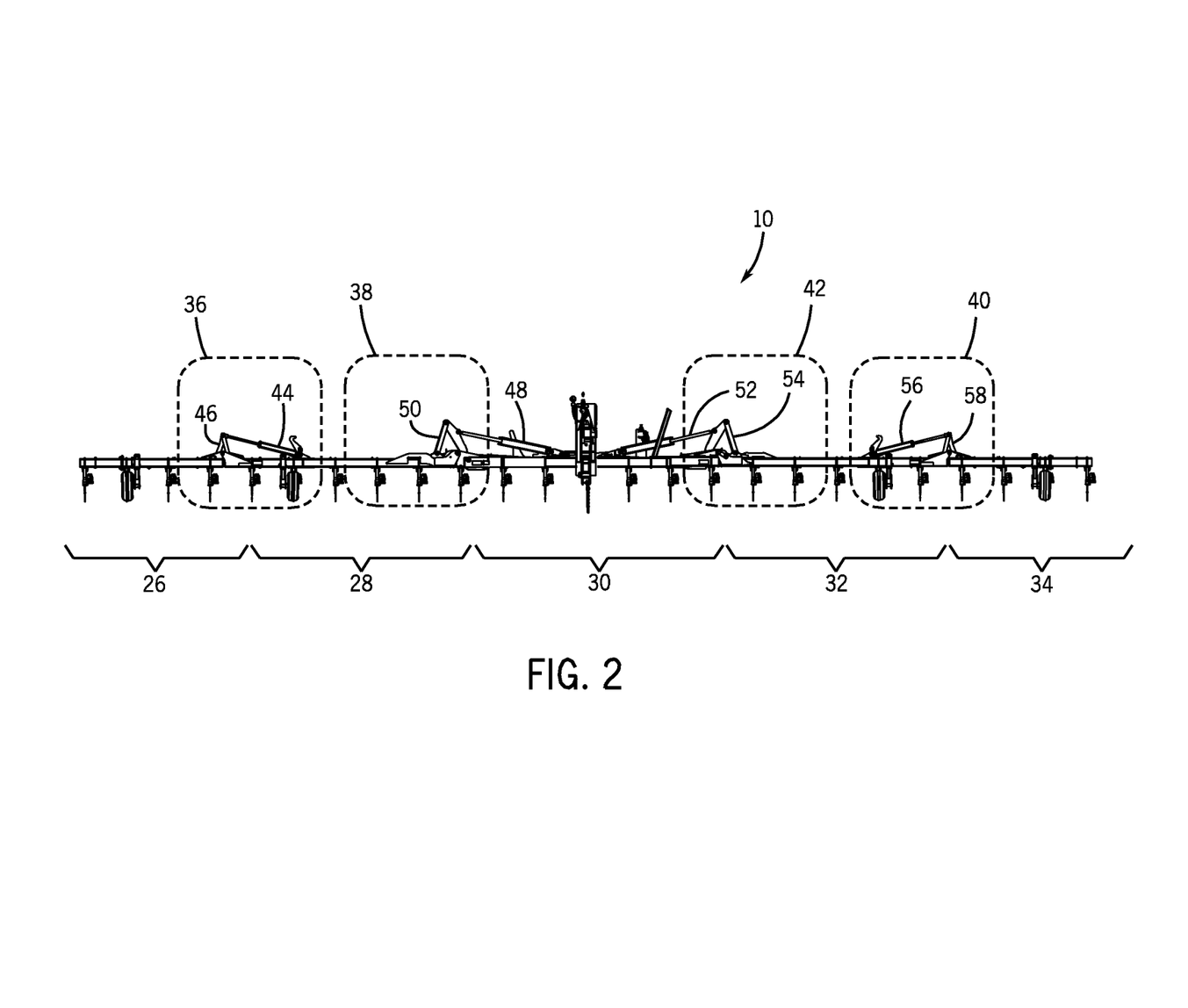
FIG. 2 is a perspective view of an embodiment of an agricultural implement illustrating pivot joints.

FIG. 2 is a perspective view of the agricultural implement 10 illustrating pivot joints between each respective wing and another wing/central tool bar 30 that each allow a respective wing to rotate in relation to a connected wing/central tool bar 30. Specifically, a right outer pivot joint 36 couples the right outer wing 26 to the right inner wing 28, and a right pivot joint 38 couples the right inner wing 28 to the central tool bar 30. Similarly, a left outer pivot joint 40 couples the left outer wing 34 to the left inner wing 32, and a left pivot joint 42 couples the left inner wing 32 to the central tool bar 30.

Additionally, the agricultural implement 10 includes mechanical devices that fold one or more wings. For example, a right outer actuating cylinder 44 may urge the right outer wing 26 into the illustrated unfolded position or may urge the right outer wing 26 into a folded position above the right inner wing 28. As can be appreciated, to fold the right outer wing 26 into a folded position above the right inner wing 28, the right outer actuating cylinder 44 may be retracted to urge the right outer arms 46 toward the right inner wing 28 and to urge the right outer wing 26 to fold inwardly toward the right inner wing 28. Similarly, the right outer wing 26 may be rotated to the illustrated unfolded position from a folded position by extending the right outer actuating cylinder 44 thereby urging the right outer wing 26 back to the illustrated unfolded position. Similar to the right outer wing 26, the right inner wing 28 may folded/unfolded by retracting/extending the right actuating cylinder 48 thereby urging the right arms 50 in a corresponding direction. Finally, the left inner wing 32 may folded/unfolded by retracting/extending the left actuating cylinder 52 thereby urging the left arms 54 in a corresponding direction, and the left outer wing 34 may be folded/unfolded by retracting/extending the left outer actuating cylinder 56 thereby urging the left outer arms 58 in a corresponding direction. Additionally, as can be appreciated, the central tool bar 30 and the wings 26, 28, 32, and 34 are subject to drag when the row units 22 engage the ground during operation of the agricultural implement 10. Although it is desirable that each of the wings 26, 28, 32, and 34 withstand expected drag during operation, it is also desirable to reduce the weight of the wings 26, 28, 32, and 34 to reduce the power needed to fold/unfold the wings as well as reduce the stress that results from the folding/unfolding. In other words, each of the wings 26, 28, 32, and 34 are designed to withstand drag while minimizing total weight.

Figure 3:
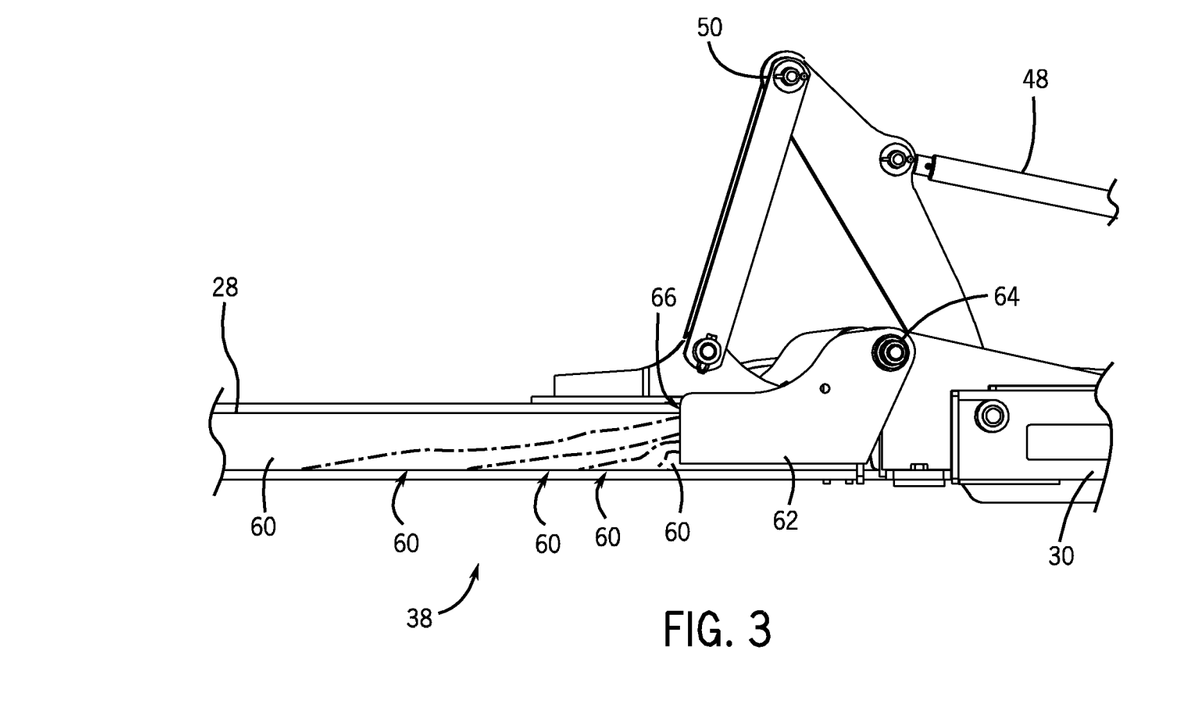
FIG. 3 is a front perspective view of an embodiment of a right pivot joint of FIG. 2 illustrating components designed to provide reduced stress gradients.

FIG. 3 is a front perspective view of an embodiment of the right pivot joint 38 illustrating components for reducing stress gradients when the implement is towed through and contacts the ground in a field. The stresses may be illustrated as having stress areas 60 under various levels of force resulting from drag occurring when the row units 22 engage the ground. The right pivot joint 38 includes a front right working plate 62 that is coupled to central tool bar 30 by a bolt 64 and welded to the right inner wing 28 along a weld edge 66. As the distance from the bolt 64 increases, the stress exerted in each stress area 60 are reduced. In certain embodiments, the front right working plate 62 may have a thickness of 1, 1.25, or 1.5 inches, although other thicknesses maybe be appropriate. Additionally, some embodiments include a front right working plate 62 having a weld edge 66 that is generally flat and/or substantially vertical. This bolt and weld connection enable the right inner wing 28 to pivot relative to the central tool bar 30. As can be appreciated, when the row units 22 coupled to the agricultural implement 10 engage the ground, the right inner wing 28 and the central tool bar 30 are subject to drag opposing the direction of travel 12. Furthermore, the stress on the right inner wing 28 and the central tool bar 30 increases around the right pivot joint 38 due to the discontinuity (e.g., break and/or change in size) between the right inner wing 28 and the central tool bar 30. Accordingly, the weld edge may traverse one or more areas of high stress on the right inner wing 28 thereby increasing stress on the weld connections and/or right inner wing 28 (i.e., the base metal or member).

Figure 4:
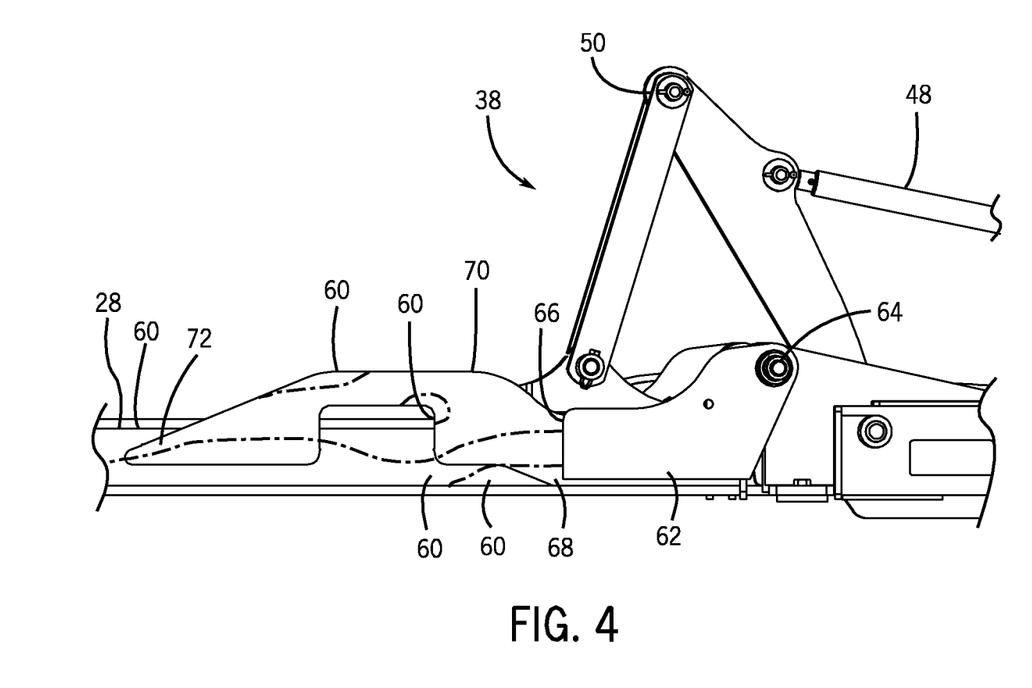
FIG. 4 is a front perspective view of an embodiment of a right pivot joint of FIG. 2 with a front right feathering plate that reduces stress gradients.

FIG. 4 is a front perspective view of an embodiment of the right pivot joint 38 with a front right feathering plate 68 designed to reduce stress gradients by extending support and resistance to stresses further out, and in a desired geometry. Thus, the front right feathering plate 68 includes a contour 70. In certain embodiments, the front right feathering plate 68 includes a contour 70 with an elongated shape, a C-shape, or other suitable shapes. In certain embodiments, the front right feathering plate 68 includes a thickness less than the thickness of the front right working plate 62. For examples, some embodiments may include a front right feathering plate 68 that has a thickness of 1, 0.75, 0.5, 0.375, or less inches. Additionally, the front right feathering plate 68 is welded to the right inner wing 28 at or around the contoured tip 72. Accordingly, the weld connection to the right inner wing 28 is moved further from the bolt 64 to reduce the stress on the weld. As can be appreciated, by moving the weld point on the right inner wing 28 away from the bolt 64 to the contoured tip 72 using the front right feathering plate 68, the stress on the weld connection is reduced when compared to the weld connections in FIG. 3.

Additionally, the front right feathering plate 68 is welded to the front right working plate 62 at the weld edge 66 and/or other edges. In certain embodiments, the front right working plate 62 and the front right feathering plate 68 may be welded before or after welding connections between the front right feathering plate 68 and the right inner wing 28 are joined. In other embodiments, the front right feathering plate 68 and the front right working plate 62 may be physically stacked and concurrently welded to each other and the right inner wing 28. Furthermore, by distributing drag throughout the right inner wing 28 using the front right feathering plate 68, the stress exerted on the weld edge 66 is reduced thereby reducing the likelihood of failure of the right pivot joint 38.

The right pivot joint 38 may also include a rear right feathering plate (not pictured) that welds to a rear right working plate and the left inner wing 28. In certain embodiments, the rear right feathering plate may include a contour having a different shape than the contour 70 of the front right feathering plate 68. In some embodiments, the rear right feathering plate and/or the front right feathering plate 68 may be selected from various elongated shapes to accommodate various components of the agricultural implement 10 (e.g., lug for right actuating cylinder 48).

Figure 5:
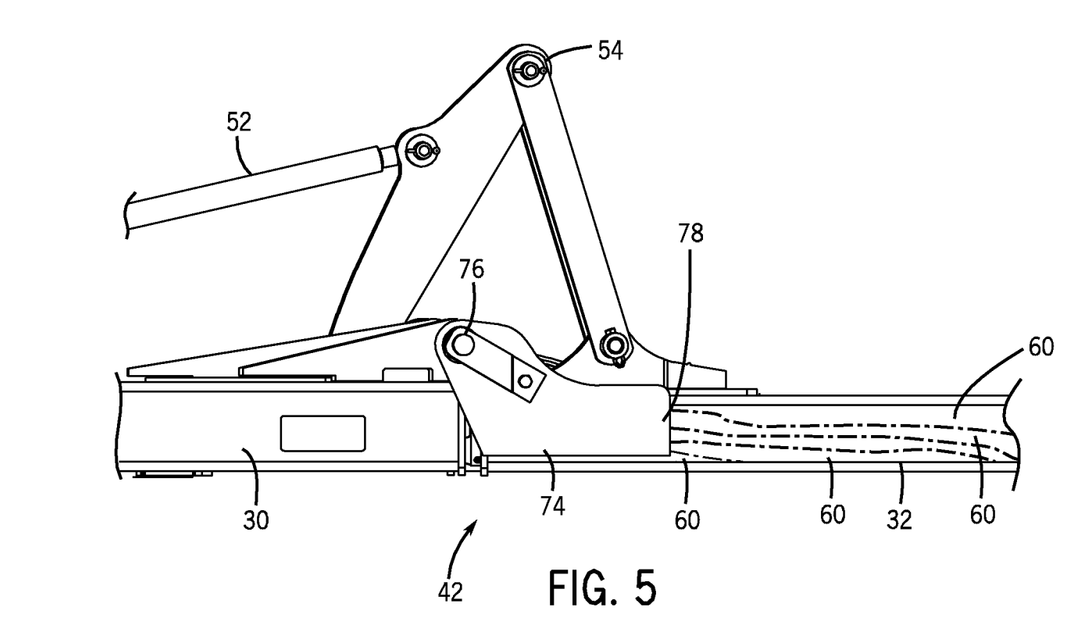
FIG. 5 is a front perspective view of an embodiment of a left pivot joint of FIG. 2 illustrating components designed to provide reduced a stress gradients.

FIG. 5 is a front perspective view of an embodiment of the left pivot joint 42 illustrating an extended and reduced stress gradient. The left pivot joint 42 includes a front left working plate 74 coupled to the central tool bar 30 via a bolt 76. In certain embodiments, the front left working plate 74 may have a thickness of 1, 1.25, or 1.5 inches, although again other thicknesses may be appropriate. Additionally, some embodiments include a front left working plate 74 having a weld edge 78 that is generally flat and/or substantially vertical. As can be appreciated, the left pivot joint 42 and front left working plate 74 may be loaded similar to the right pivot joint 38 of FIG. 3 when the row units 22 engage the ground. Accordingly, the stress areas 60 on the left inner wing 32 are highest near the bolt 76. Thus, the weld edge 78 of the left pivot joint 42 may traverse multiple stress areas 60 under various levels of stress. Since the weld connection is made in a stress area 60 of higher stress near the bolt 76 and/or across multiple stress areas 60, the stress on the weld connection, the left pivot joint 42, and/or the left inner wing 32 is heightened.

Figure 6:
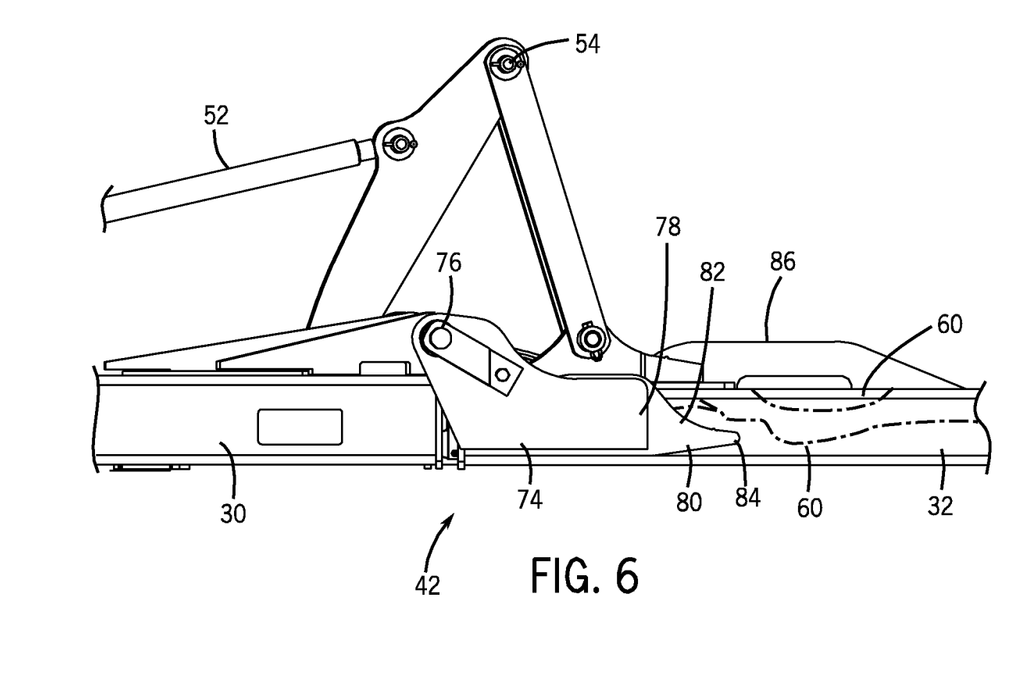
FIG. 6 is a front perspective view of an embodiment of a left pivot joint of FIG. 2 with a front right feathering plate that reduces stress gradients.

FIG. 6 is a front perspective view of an embodiment of the left pivot joint 42 with a front left feathering plate 80 illustrating a stress gradient. In certain embodiments, the front left feathering plate 80 may have a thickness (e.g., 1, 0.75, 0.5, 0.375, or less inches) less than the front left working plate 74. Moreover, the front left feathering plate 80 includes a contour 82 and a contoured tip 84. In certain embodiments, the front left feathering plate 80 may include a contour 82 having a different shape than the shape of the contour 70 of the front right feathering plate 68. For example, some embodiments of the agricultural implement 10 may include front right and front left feathering plates 68 and 82 having different shapes to accommodate various components of the agricultural implement 10 (e.g., lug for left actuating cylinder 52). Moreover, the front left feathering plate 80 is welded to the front left working plate 74 at the weld edge 78 and/or another edge. Additionally, the front left feathering plate 80 is welded to the left inner wing 32 at or around the contoured tip 84. In certain embodiments, the front left working plate 74 and the front left feathering plate 80 may be welded before or after welding connections between the front left feathering plate 80 and the left inner wing 32 are joined. In other embodiments, the front left feathering plate 80 and the front left working plate 74 may be physically stacked and concurrently welded to each other and the left inner wing 32.

As previously discussed, by locating a welded connection to the left inner wing 32 and the front left feathering plate 80 further from the bolt 76, the weld is connected at a stress area 60 of less stress than the weld connection in FIG. 5 thereby reducing the risk of failure of the weld when the row units 22 engage the soil during operation of the agricultural implement 10. Furthermore, by distributing the stress from the bolt 76 across the front left feathering plate 80, weld connections at the weld edge 78 and/or other locations around the front right working plate 74 are subjected to less stress in FIG. 6 that in FIG. 5.

Moreover, the left pivot joint 42 includes a rear connection between the central tool bar 30 and the left inner wing 32 using rear left feathering plate 86. In certain embodiments, the rear left feathering plate 86 may have a different shape than that of the front left feathering plate 80 to accommodate various connections for the agricultural implement (e.g., lug for the left actuating cylinder 52). Furthermore, in some embodiments, the front right feathering plate 68 has the same shape as the rear left feathering plate 86, and the front left feathering plate 80 has the same shape as the rear right feathering plate. While the foregoing discussion related only to the right pivot joint 38 and the left pivot joint 42, similar feathering plates and/or working plates may be used in the right outer pivot joint 36 and/or the left outer pivot joint 40.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A towed implement comprising:
a first tool bar supporting first ground engaging tools;
a second tool bar supporting second ground engaging tools and coupled to the first tool bar by a pivot joint;
a working plate secured to the first tool bar and having a joint structure partially defining the pivot joint; and
a stress feathering plate sandwiched between the working plate and the first tool bar and secured to both the working plate and the first tool bar, the stress feathering plate extending beyond the working plate and having a contour that provides a reduced stress gradient when the first tool bar, the working plate and the stress feathering plate are loaded at least in part by engagement of the first and second ground engaging tools with the ground, wherein the stress feathering plate comprises a first face in contact with the working plate and a second face in contact with the first tool bar.

2. The towed implement of claim 1, wherein the working plate and the stress feathering plate are welded to the first tool bar.

3. The towed implement of claim 1, wherein the working plate has a generally flat end on a side thereof corresponding to the contour of the stress feathering plate.

4. The towed implement of claim 1, wherein the working plate is thicker than the stress feathering plate.

5. The towed implement of claim 4, wherein working plate has a thickness of greater than 1 inch, and the stress feathering plate has a thickness less than 1 inch.

6. The towed implement of claim 5, wherein the working plate has a thickness of at least 1.5 inches, and the stress feathering plate has a thickness less than 0.5 inches.

7. The towed implement of claim 1, wherein the second tool bar comprises a second working plate and a second stress feathering plate adjacent to the pivot joint, wherein the second stress feathering plate comprises a third face in contact with the second working plate and a fourth face in contact with the second tool bar.

8. The towed implement of claim 7, wherein the second working plate is different from the working plate of the first tool bar.

9. The towed implement of claim 7, wherein the second stress feathering plate has a different shape than the stress feathering plate of the first tool bar.

10. The towed implement of claim 1, wherein working plate and the feathering plate are disposed on a fore side of the first tool bar, and wherein the first tool bar comprises a second working plate and a second stress feathering plate adjacent to the pivot joint on an aft side of the first tool bar.

11. The towed implement of claim 10, wherein the second working plate is different from the working plate of the fore side of the first tool bar.

12. The towed implement of claim 10, wherein the second stress feathering plate has a different shape than the stress feathering plate of the fore side of the first tool bar.

13. A towed implement comprising:
a first tool bar supporting first ground engaging tools;
a second tool bar supporting second ground engaging tools and coupled to the first tool bar by a pivot joint;
a fore structure disposed on a fore side of the first tool bar, the fore structure comprising a fore working plate secured to the fore side of the first tool bar and having a joint structure partially defining the pivot joint, and a fore stress feathering plate sandwiched between the fore working plate and the fore side of the first tool bar and secured to both the fore working plate and the fore side of the first tool bar, the fore stress feathering plate extending beyond the fore working plate and having a first contour that provides a reduced stress gradient when the first tool bar, the fore working plate and the fore stress feathering plate are loaded at least in part by engagement of the first and second ground engaging tools with the ground, wherein the fore stress feathering plate comprises a first face in contact with the fore working plate and a second face in contact with the fore side of the first tool bar; and
an aft structure disposed on an aft side of the first tool bar, the aft structure comprising an aft working plate secured to the aft side of the first tool bar and having a joint structure partially defining the pivot joint, and an aft stress feathering plate sandwiched between the aft working plate and the aft side of the first tool bar and secured to both the aft working plate and the aft side of the first tool bar, the aft stress feathering plate extending beyond the aft working plate and having a second contour that provides a reduced stress gradient when the first tool bar, the aft working plate and the aft stress feathering plate are loaded at least in part by engagement of the first and second ground engaging tools with the ground, wherein the stress feathering plate comprises a third face in contact with the aft working plate and a fourth face in contact with the aft side of the first tool bar.

14. The towed implement of claim 13, wherein the fore structure is different from the aft structure.

15. The towed implement of claim 14, wherein the fore working plate is different from the aft working plate.

16. The towed implement of claim 14, wherein the first contour has a different shape than the second contour.

17. A towed implement comprising:
a first tool bar supporting first ground engaging tools;
a second tool bar supporting second ground engaging tools and coupled to the first tool bar by a pivot joint;
a first structure disposed on the first tool bar, the first structure comprising a first working plate secured to the first tool bar and having a joint structure partially defining the pivot joint, and a first stress feathering plate sandwiched between the first working plate and the first tool bar and secured to both the first working plate and the first tool bar, the first stress feathering plate extending beyond the first working plate and having a first contour that provides a reduced stress gradient when the first tool bar, the first working plate and the first stress feathering plate are loaded at least in part by engagement of the first and second ground engaging tools with the ground, wherein the first stress feathering plate comprises a first face in contact with the first working plate and a second face in contact with the first tool bar; and
a second structure disposed on the second tool bar, the second structure comprising a second working plate secured to the second tool bar and having a joint structure partially defining the pivot joint, and a second stress feathering plate sandwiched between the second working plate and the second tool bar and secured to both the second working plate and the second tool bar, the second stress feathering plate extending beyond the second working plate and having a second contour that provides a reduced stress gradient when the second tool bar, the second working plate and the second stress feathering plate are loaded at least in part by engagement of the first and second ground engaging tools with the ground, wherein the second stress feathering plate comprises a third face in contact with the second working plate and a fourth face in contact with the second tool bar.

18. The towed implement of claim 17, wherein the first contour has a different shape than the second contour.

19. The towed implement of claim 18, wherein the first working plate is different from the second working plate.

20. The towed implement of claim 18, wherein the first stress feathering plate has a different shape than the second stress feathering plate.

* * * * *